F. W. SUMMERFIELD.
BEE SHIPPING PACKAGE.
APPLICATION FILED JAN. 19, 1917.
1,239,536.
Patented Sept. 11, 1917.
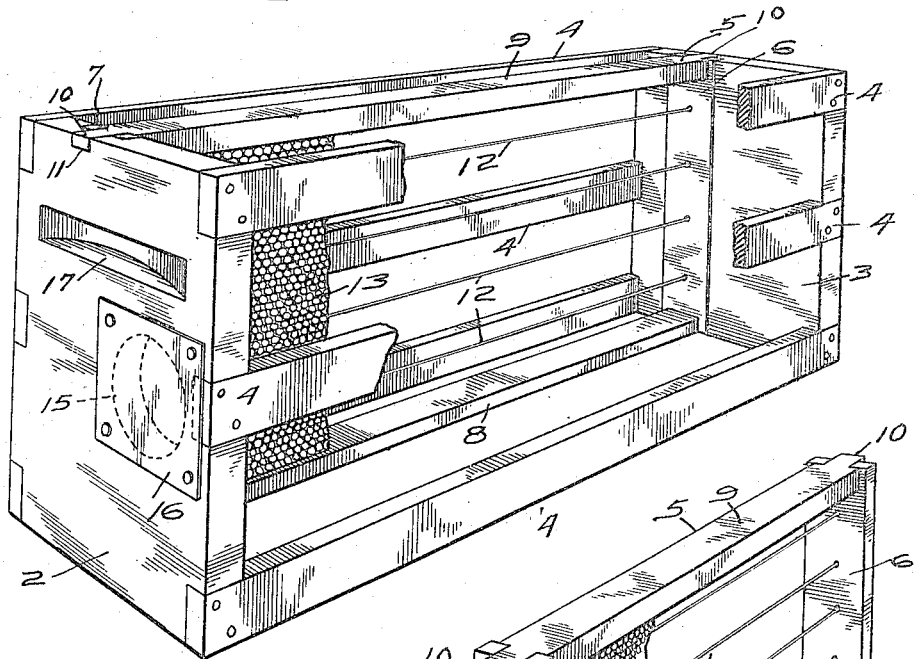
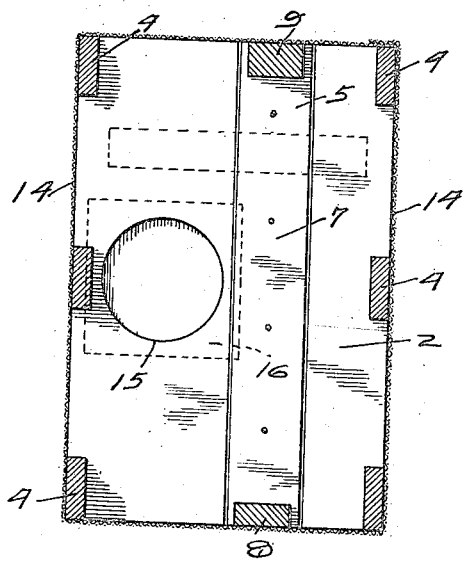
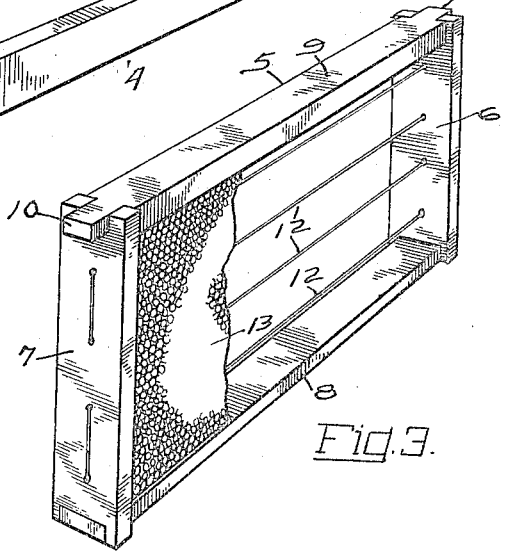
INVENTOR
Frederick W. Summerfield
by
Owen, Owen & Crampton

UNITED STATES PATENT OFFICE.

FREDERICK W. SUMMERFIELD, OF TOLEDO, OHIO.

BEE-SHIPPING PACKAGE.

1,239,536.　　　　Specification of Letters Patent.　　Patented Sept. 11, 1917.

Application filed January 19, 1917. Serial No. 143,292.

*To all whom it may concern:*

Be it known that I, FREDERICK W. SUMMERFIELD, a citizen of the United States, and a resident of Toledo, in the county of Lucas and State of Ohio, have invented a certain new and useful Bee-Shipping Package; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to a bee shipping package or crate. It particularly has for its object to provide a container for bees while in transportation from one part of the country to another. It particularly has for its object to provide a container wherein the surrounding conditions of the bee within the container are normal and to provide a container in which the bees may be readily inserted, and also one wherein the bees will have plenty of air and food. It also has for its object to provide a container wherein the queen bee may be cared for under the normal conditions to which she has been subjected prior to the shipment.

Structures containing my invention may partake of different forms. I have illustrated in the drawings and will describe hereinafter one of such structures which is selected for purposes of illustration.

Figure 1 of the drawings is a perspective view of the bee package, a part thereof being shown removed and a part being shown broken for purposes of illustration. Fig. 2 is a sectional view of the container or package and Fig. 3 illustrates a frame for carrying the food and the cells having therein eggs, larvæ and one or more queen bees.

Figure 1, is a frame for the package. It has end walls 2 and 3. The end walls 2 and 3 are secured together by strips 4.

A honey-comb frame 5 having end members 6 and 7 and connecting or side strips 8 and 9, is placed within the frame 1. The end walls 2 and 2 are rabbeted and the end strips 7 and 6 slide into the rabbeted parts of the end walls. The side or top strip 9 is provided with lugs 10 which drop into notches 11 located in the upper edges of the end walls 2 and 3. Wires 12 are stretched between the ends 6 and 7 to support the comb 13 which is formed on the wires by the bees. The frame 5 is placed in a hive until the queen has become accustomed to the comb and its supporting frame 5, and until the desired number of larvæ and eggs have been laid and the desired amount of honey has been deposited within the comb. The frame 5 is then removed from the hive and placed in the frame 1. After a wire screen 14 has been tacked around the sides and bottom, of the frame 1, the top of the frame is covered with the screen 14. One of the end walls 2 is provided with an opening 15 into which the bees may be inserted by the use of a funnel, in the manner well known in the art. The opening 15 is then closed by a piece of tin or sheet metal 16 and thus the desired number of bees are inclosed within the package. If desired, handles or channels 17 may be cut into the end walls 2 and 3 for convenience of handling the package.

The construction illustrated may be modified by those skilled in the art without departing from the spirit of the invention as set forth in the claim.

I claim:

In a bee shipping package, the combination of a frame, the ends of the frame having channels, a second frame slidable in the said channels and located within the first named frame, wires stretched across the second frame and having thereon a honey-comb containing honey, a wire screen surrounding the first named frames, the end wall of the first named frame having an opening for the receipt of bees.

In testimony whereof, I have hereunto signed my name to this specification.

FREDERICK W. SUMMERFIELD.

Copies of this patent may be obtained for five cents each, by addressing the "Commissioner of Patents, Washington, D. C."